US007200985B2

(12) United States Patent
Tuttle et al.

(10) Patent No.: US 7,200,985 B2
(45) Date of Patent: Apr. 10, 2007

(54) FUEL DELIVERY SYSTEM HAVING AN ECOLOGY VALVE

(75) Inventors: David J. Tuttle, South Bend, IN (US); Steven Fisher, South Bend, IN (US); Christopher D. Eick, Phoenix, AZ (US); Michael A. McPherson, Phoenix, AZ (US)

(73) Assignee: Honeywell International Inc., Morris Township, NJ (US)

( * ) Notice: Subject to any disclaimer, the term of this patent is extended or adjusted under 35 U.S.C. 154(b) by 374 days.

(21) Appl. No.: 10/847,813

(22) Filed: May 18, 2004

(65) Prior Publication Data

US 2005/0011197 A1    Jan. 20, 2005

Related U.S. Application Data

(60) Provisional application No. 60/486,900, filed on Jul. 15, 2003.

(51) Int. Cl.
*F02C 7/232* (2006.01)
*F02C 9/26* (2006.01)

(52) U.S. Cl. .................. 60/39.094; 60/39.281
(58) Field of Classification Search ............ 60/39.094, 60/39.281, 734
See application file for complete search history.

(56) References Cited

U.S. PATENT DOCUMENTS

| | | | |
|---|---|---|---|
| 4,760,696 A | 8/1988 | Rooks et al. | |
| 4,817,389 A | 4/1989 | Holladay et al. | |
| 5,809,771 A | 9/1998 | Wernberg | |
| 6,314,998 B1 | 11/2001 | Futa, Jr. et al. | |
| 6,334,296 B2 | 1/2002 | Futa, Jr. et al. | |
| 6,385,962 B2 | 5/2002 | Futa, Jr. et al. | |
| 6,422,021 B1 | 7/2002 | Futa, Jr. et al. | |
| 6,619,025 B2* | 9/2003 | Wernberg | 60/39.094 |
| 6,807,801 B2* | 10/2004 | McCarty | 60/39.094 |
| 2002/0095936 A1 | 7/2002 | Futa, Jr. et al. | |
| 2002/0184884 A1 | 12/2002 | McCarty | |
| 2003/0110775 A1 | 6/2003 | Wernberg | |

* cited by examiner

*Primary Examiner*—L. J. Casaregola
(74) *Attorney, Agent, or Firm*—Birch, Stewart, Kolasch & Birch, LLP

(57) ABSTRACT

A fuel control system for a gas turbine engine is disclosed that includes a flow path carrying fuel from a fuel source to a combustion chamber, an ecology valve 124 for removing a quantity of fuel from the flow path, the ecology valve 124 being shiftable in a first direction from a first position to a second position and in a second direction from said second position to said first position and a fuel line 115 connected between the flow path and the ecology valve 124 for moving fuel between the flow path and the ecology valve 124 to bias the ecology valve 124 toward the second position, where the fuel line 115 is configured, such as by the inclusion of an orificed check valve 150 therein, to allow fuel to move therethrough away from the ecology valve 124 at a greater rate than toward the ecology valve 124.

7 Claims, 3 Drawing Sheets

FUEL DELIVERY SYSTEM HAVING AN ECOLOGY VALVE

CROSS REFERENCE TO RELATED APPLICATIONS

The present invention claims the benefit of U.S. Provisional Patent Application No. 60/486,900 filed Jul. 15, 2003, the entire contents of which are hereby incorporated by reference.

FIELD OF THE INVENTION

This invention generally relates to fuel delivery systems for engines, including aircraft gas turbine engines, and more particularly, to a fuel delivery system having an ecology valve and a method for operating such a system.

BACKGROUND OF THE INVENTION

After a gas turbine engine, such as an aircraft engine, is shut down, fuel left in the nozzles and nearby plumbing can overheat and cause coking. Fuel left in the nozzles can also leak out of the engine onto the ground or tarmac. The coking deposits are detrimental to the engine and may affect engine performance, and the leaking of fuel onto the ground or tarmac is prohibited by federal regulations.

To address these issues, many modern gas turbine engines incorporate a fuel ecology system to purge the fuel manifolds after shutdown, often by using an "ecology valve" that withdraws a quantity of fuel from the manifolds. This both reduces the formation of coking deposits in the manifolds and nozzles and prevents fuel from dripping out of the engine after shutdown.

Particular ecology systems for gas turbine engines have previously been described in: U.S. Pat. Nos. 6,314,998; 6,334,296; 6,385,962; and 6,422,021, each titled "Fuel Divider and Ecology System for a Gas Turbine Engine," the entire contents of which are herein incorporated by reference. Each of these patents describes an arrangement having a plurality of engine fuel manifolds and a fuel dividing arrangement for distributing fuel flow among the plurality of manifolds.

One known fuel ecology system utilizes a piston to draw the fuel backwards from the fuel nozzles to a storage space. The piston is biased into a first position by pressure in the fuel supply path, which is communicated to the piston via a first fuel line. When the pressure in the fuel supply path drops at engine shutdown, the biasing force is removed from the piston allowing it to shift to a second position under the force of a biasing spring. This movement from the first to the second position draws fuel from the manifold. The volume of fuel drawn from the fuel manifolds in this particular system is approximately 7.8 cubic inches.

At the next engine start, fuel is pumped to the fuel manifolds and through the first fuel line to the ecology valve. The 7.8 cubic inches of fuel is re-introduced to the manifolds as rising fuel pressure drives the piston toward the first position. However, at a typical start flow rate of 160 pph, a system equipped with an ecology valve requires nearly 5 seconds to fill the fuel manifolds and deliver fuel to the engine combustion chamber.

Ideally, fuel should be available in the combustion chamber to start the engine when the engine reaches 10 to 15 percent of maximum speed; such an engine may be referred to as having a lightoff speed envelope of 10 to 15 percent. Unfortunately, in fuel delivery systems incorporating an ecology valve, the starter may accelerate the engine to a speed higher than the lightoff speed envelope, to about 22 percent of maximum speed in some cases, before the fuel manifolds are adequately pressurized. Engines may not start reliably at speeds outside the lightoff speed envelope. It is therefore desirable to provide a fuel control system with an ecology function that can be started while engine speed is within the engine's lightoff speed envelope.

SUMMARY OF THE INVENTION

These and other shortcomings of prior systems are addressed by the present invention which comprises, in a first aspect, a valve added to a fuel control system to prioritize the delivery of fuel to the combustion chamber to sequence the refilling of the secondary nozzle plumbing.

Another aspect of the invention comprises a fuel control system for a gas turbine engine that includes a flow path carrying fuel from a fuel source to a combustion chamber and an ecology valve for removing a quantity of fuel from the flow path. The ecology valve is shiftable in a first direction from a first position to a second position and in a second direction from the second position to the first position. A fuel line is connected between the flow path and the ecology valve to move fuel between the flow path and the ecology valve to bias the ecology valve toward the second position, the fuel line being configured to allow fuel to move therethrough away from the ecology valve at a greater rate than toward the ecology valve.

Another aspect of the invention comprises a method of controlling a fuel supply of a gas turbine engine comprising a flow path carrying fuel from a fuel source to a combustion chamber and an ecology valve. The ecology valve is shiftable in a first direction for removing a quantity of fuel from the flow path and in a second direction for returning the quantity of fuel to the flow path. The method involves providing a first fuel line connected between the flow path and the ecology valve and supplying fuel under pressure through the first fuel line to bias the ecology valve in the second direction so that the rate of fuel flow through the first fuel line in a direction toward the ecology valve is restricted.

In another aspect, the invention comprises a method of providing fuel to a gas turbine engine having an engine speed and a lightoff speed envelope of 10 to 15 percent of engine speed. The engine includes a fuel control system having an ecology valve, the position of which is affected by a pressure in a fuel path to the engine. Fuel is supplied to the ecology valve to bias the ecology valve in a first direction in a manner that still provides sufficient fuel to the engine to allow the engine to start before exceeding its lightoff speed envelope.

A further aspect of the invention comprises a method of controlling fuel flow to a gas turbine engine having a fuel manifold and an ecology valve for selectively withdrawing a quantity of fuel from the fuel manifold. Fuel is supplied to the fuel manifold via a fuel path at a first rate that is too low to fill the manifold and bias the ecology valve into the first position before the engine speed exceeds the engine speed lightoff speed envelope. To address this issue, the shifting of the ecology valve into the first position is delayed until after the manifold is filled.

Another aspect of the invention comprises a fuel control system for a gas turbine engine having a fuel flow path that runs from a metering valve to a gas turbine engine combustion chamber. The metering valve supplies a fuel flow to the flow path at a first rate. A first component of the flow is directed to the combustion chamber and a second component of the flow is directed to an ecology valve to bias the ecology valve toward a first position. The first rate is insufficient to supply adequate fuel to the combustion chamber and shift the ecology valve into the first position before the engine speed exceeds its lightoff speed envelope. A valve is provided in the fuel flow second component for limiting fuel flow toward the ecology valve.

A further aspect of the invention comprises a method of controlling a fuel supply of a gas turbine engine which fuel supply includes a flow path carrying fuel from a fuel source to a combustion chamber and an ecology valve that is shiftable in a first direction for drawing a first quantity of fuel from the flow path into the ecology valve and in a second direction for returning the first quantity of fuel to the flow path. The method involves supplying a second quantity of fuel from the flow path to the ecology valve at a first rate to bias the ecology valve in the second direction and returning the second quantity of fuel from to the flow path at a second rate greater than the first rate.

BRIEF DESCRIPTION OF THE DRAWINGS

These and other aspects and features of the invention will be better understood after a reading of the following detailed description in connection with the drawings wherein.

DETAILED DESCRIPTION

Figure 1:
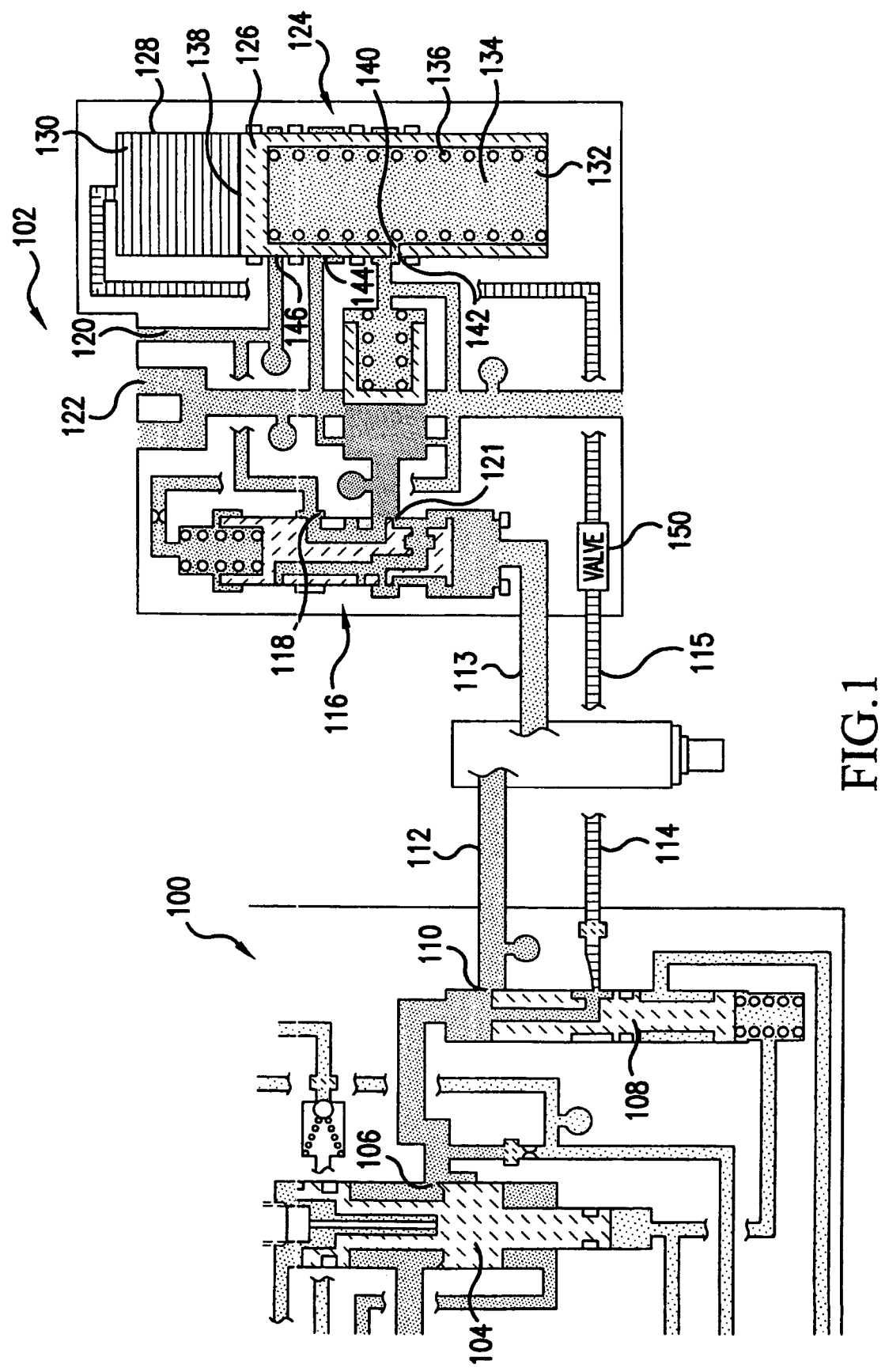
FIG. 1 is a schematic view of a portion of a fuel delivery system including an ecology valve and a prioritization valve according to the present invention.

Referring now to the drawings, wherein the showings are for purposes of illustrating embodiments of the invention only and not for the purpose of limiting same, FIG. 1 illustrates a fuel control system for a gas turbine engine (not shown) that includes a metering portion 100 and an auxiliary portion 102. Metering portion 100 comprises a metering valve 104 having an output port 106 for delivering a metered fuel flow to a pressurizing valve 108. Pressurizing valve 108 includes a pressurizing output port 110 for sending a first flow of fuel along a fuel flow path 112 comprising a fuel line 113 to auxiliary valve portion 102 and a second flow of fuel along a control flow path 114 comprising a fuel line 115 to auxiliary portion 102.

Fuel flow path 112 includes a flow divider valve 116 having a first port 118 outputting a fuel flow to atomizer manifolds 120 and a second port 121 outputting a fuel flow to air blast manifolds 122.

Control flow path fuel line 115 leads to an ecology valve 124 in auxiliary portion 102 which comprises a valve body 126 mounted for sliding movement within a valve sleeve 128 having a first end 130 and a second end 132. Valve body 126 includes a hollow interior 134 in which a spring 136 is mounted to bias valve body 126 toward first end 130 of sleeve 128. Control flow path fuel line 115 connects to first end 130 of valve sleeve 128 to deliver fuel to first end 130 of valve sleeve 128 to affect the pressure exerted against outer surface 138 of the valve body 126.

The interior 134 of valve body 126 includes a port 140 allowing fluid communication between interior 134 and air blast manifolds. 122 and atomizer manifolds 120 when valve body 126 is in certain positions within sleeve 128, namely when port 140 is aligned with a first fuel port 142, a second fuel port 144 and a third fuel port 146 in valve sleeve 128.

Figure 2:
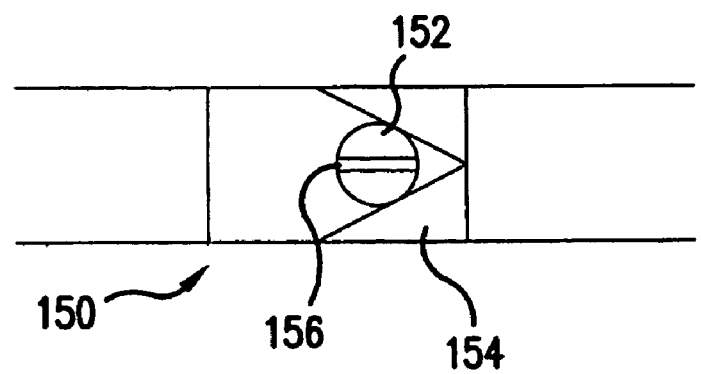
FIG. 2 is a detail view of the prioritization valve of FIG. 1.

Control flow path fuel line 115 also includes a prioritization valve 150, shown in detail in FIG. 2, which, in this embodiment, comprises a check valve having a check valve body 152, a check valve housing 154 and an orifice 156; the function of valve 150 will be discussed further hereinafter.

The function of ecology valve 124 is to remove a quantity of fuel from atomizer manifolds 120 and air blast manifolds 122 upon engine shutdown to prevent fuel from leaking from the manifolds 120, 122 onto the ground and/or evaporating in the manifolds and leaving deposits that may interfere with fuel flow. To this end, valve body 126 is biased into a second position shown in FIG. 1 by the pressure of fuel in control flow path fuel line 115 acting on outer surface 138 of valve body 126. Once this pressure is established, substantially all fuel exiting metering valve 104 flows along fuel flow path 112, through flow divider valve 116, and to the engine.

Upon engine shutdown, fuel pressure in fuel flow path fuel line 113 and control flow path fuel line 115 drops which decreases the pressure exerted against outer surface 138 of valve body 126. Valve spring 136 then pushes valve body 126 toward the first end 130 of valve sleeve 128 and expels fuel from the portion of valve sleeve 128 between outer surface 138 and control flow path fuel line 115. At the same time, the movement of valve body 126 lowers the pressure in interior 134 of the valve body and draws fuel from fuel air blast manifolds 122 through port 140 and into the interior of valve body 126 as port 140 aligns with first fuel port 142 and second fuel port 144 and from atomizer manifolds 120 as port 140 aligns with third fuel port 146 during its travel from the second position shown in FIG. 1 to a first position with outer surface 138 close to or in contact with the first end of valve sleeve 128. A first quantity of fuel is thus drawn into the interior of ecology valve 124 and held there to substantially prevent leakage from the manifolds 120, 122.

When the engine is to be restarted, a starter begins to turn the engine. At this time, fuel flows through metering valve 104 to pressurizing valve 108. Some fuel flows along fuel flow path 112 while another portion flows along control flow path 114 and begins to bias ecology valve body 126 toward a second position toward second end 132 of valve sleeve 128. This expels the given volume of fuel from the inside of the valve body 126 into the atomizer manifold 120 through port 146 and into the air blast manifolds through ports 144 and 146.

The engine cannot be started until the atomizer manifolds 120 are pressurized to a predetermined degree (referred to herein as "fully pressurized"). The engine has a combustor lightoff window or "lightoff speed window" at which it is optimally lighted, which combustor lightoff window is about 10 to 15 percent of engine speed in the present embodiment. It requires approximately 2.5 seconds for the engine to reach this speed under normal conditions. However, because fuel is diverted to the ecology valve 124 via control fuel path 114, the atomizer manifolds 122 are not fully pressurized until about 5 seconds after the engine begins to turn. At this 5 second mark, the engines are typically moving at about 22 percent speed. While ignition is possible at this speed, obtaining engine lightoff outside the combustor lightoff window is more difficult and engine no-start conditions can occur.

This problem is addressed by a prioritization valve 150 in control fuel path 114 which limits the flow rate of fuel along control fuel path fuel line 115 toward ecology valve 124 due to the restriction imposed by the orificed check valve body 152. This valve 150 allows substantially unimpeded flow away from ecology valve 124 during engine shutdown, but restricts flow to a lower level during engine start up. In this manner, sufficient fuel is supplied to atomizer manifolds 120 at start up to help ensure that the atomizer manifolds 120 are fully pressurized before the engine speed exceeds the combustor lightoff window.

In one specific implementation, the orifice 156 of check valve 150 is sized to divert 40 pph (of a 160 pph total flow) to the flow divider valve 116. The flow divider valve 116, in turn, prioritizes the 40 pph flow to the start nozzles which are quickly filled and flowing within the 2.5 second time requirement. The other 120 pph is allowed to flow to the ecology valve 124. In summary, the prioritization valve diverts a predetermined amount of flow to the start fuel nozzles during the starting transient.

Figure 3:
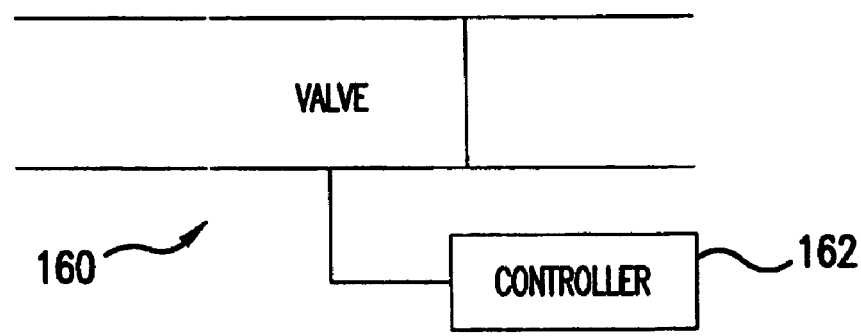
FIG. 3 is a first alternate embodiment of the prioritization valve of FIG. 1.

An alternative prioritization valve is shown in FIG. 3. In this embodiment, a prioritization valve 160 is controlled by a controller 162. Controller 162 sets the position of valve 160 to allow a high flow rate at engine shutdown while restricting flow rate at engine start up.

Figure 4:
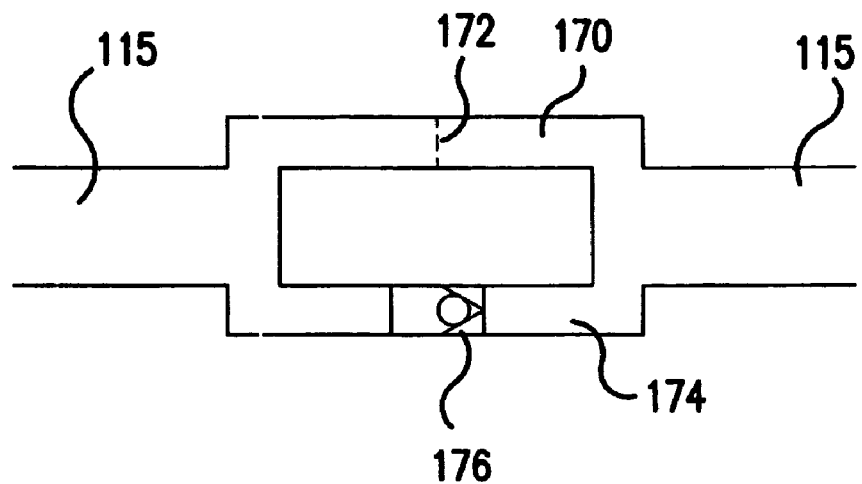
FIG. 4 is a second alternate embodiment of the prioritization valve of FIG. 1.

A second alternative prioritization valve is shown in FIG. 4. In this embodiment, a portion of control flow path fuel line 115 includes two parallel sections a first section 170 having an orifice 172 and a second section 174 having a check valve 176 for preventing flow therethrough in a direction toward ecology valve 124. Fuel flow away from ecology valve 124 at engine shutdown is allowed through first and second parallel sections 170, 172 and fuel therefore flows at a higher rate away from ecology valve 124 than toward the ecology valve.

Figure 5:
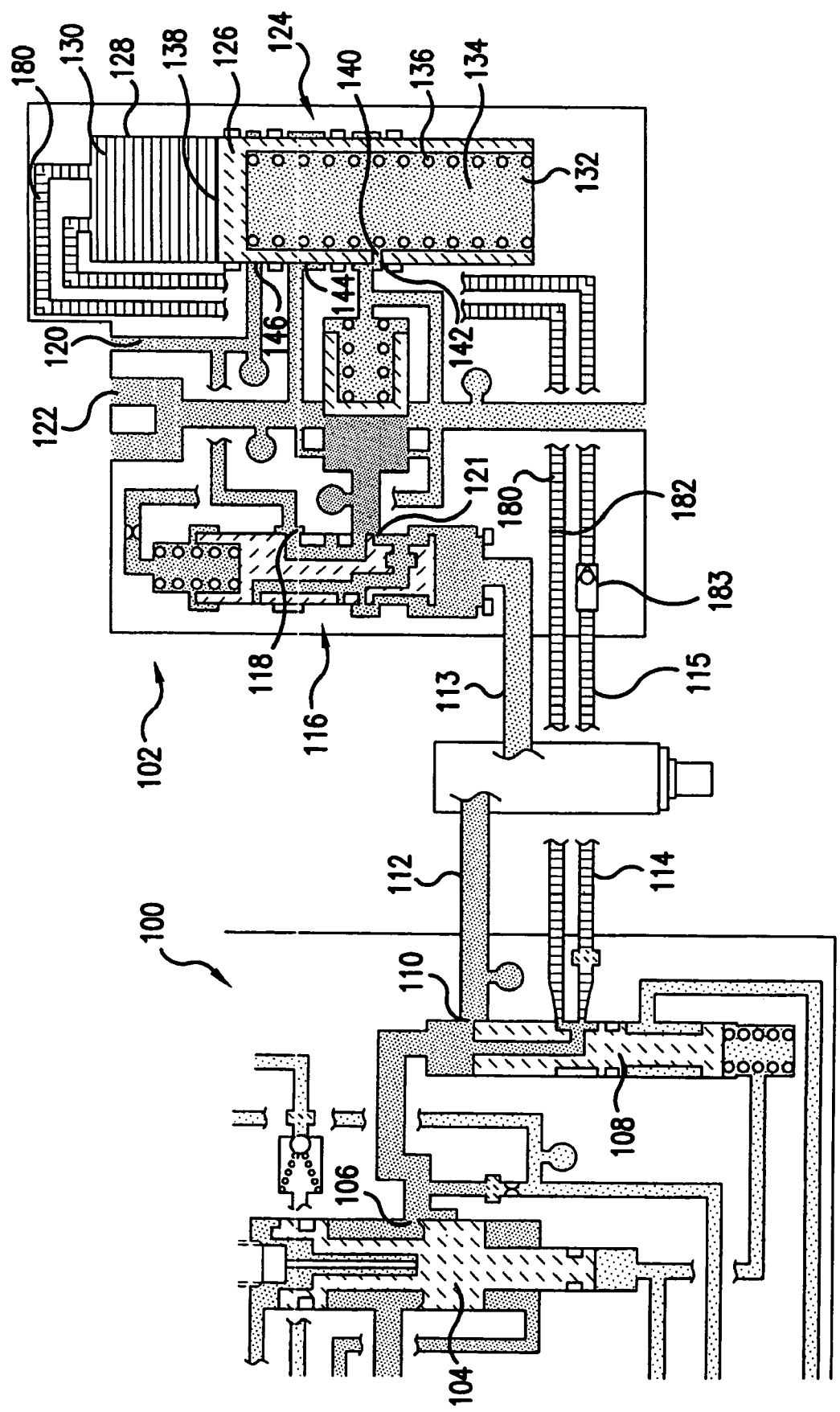
FIG. 5 is a schematic view of a second embodiment of a portion of a fuel delivery system according to the present invention.

FIG. 5 illustrates a second embodiment of a fuel control system according to the present invention wherein elements common to the first embodiment are designated by identical reference numerals. In this embodiment, a second fuel control line 180 connects pressurizing valve 108 to ecology valve 126. An orifice 182 is provided in second fuel control line 180 to control fuel flow therethrough. A non-orificed check valve 183 is provided in control flow path 114 such that fuel is substantially prevented from flowing toward ecology valve 126 through flow path 114, at engine start up, for example, but is allowed to flow away from ecology valve 126 through flow path 114 and second fuel line 180, at engine shut down, for example. Second fuel control line 180 is sized such that the ecology valve 126 is not fully shifted to the second position before the fuel manifolds 122 are fully pressurized.

Although principles of the present invention have been described, it should be recognized that the present invention is not limited to such a specific implementation.

What is claimed is:

1. A fuel control system for a gas turbine engine comprising:
   a flow path carrying fuel from a fuel source to a combustion chamber;
   an ecology valve for removing a quantity of fuel from said flow path, said ecology valve being shiftable in a first direction from a first position to a second position and in a second direction from said second position to said first position; and
   at least one fuel line connected between said flow path and said ecology valve for moving fuel between said flow path and said ecology valve to bias said ecology valve toward said second position, said at least one fuel line including an orificed check valve to allow fuel to move through said at least one fuel line away from said ecology valve at a greater rate than toward said ecology valve.

2. The fuel control system of claim 1 including a manifold in said flow path, wherein said manifold is substantially emptied when said ecology valve moves into said first position.

3. The fuel control system of claim 2 wherein the orifice in said orificed check valve allows fuel to flow through said at least one fuel line toward said ecology valve at a first rate, said first rate being selected to allow said manifold to fill before said ecology valve is fully biased into said second position.

4. The fuel control system of claim 3 wherein said orificed check valve allows fuel to flow away from said ecology valve at a second rate greater than said first rate.

5. The fuel control system of claim 4 wherein said at least one fuel line comprises exactly one fuel line.

6. In a fuel control system for a gas turbine engine having a speed and a lightoff speed envelope, said system comprising a fuel flow path running from a metering valve to a gas turbine engine combustion chamber, said metering valve supplying a fuel flow to said flow path at a first rate, a first component of said fuel flow being directed to the combustion chamber and a second component of said fuel flow being directed to an ecology valve to bias the ecology valve toward a first position, said first rate being insufficient to supply adequate fuel to said combustion chamber and shift said ecology valve into said first position before the engine speed exceeds said lightoff speed envelope, the improvement comprising:
   an orificed check valve in said fuel flow second component for limiting fuel flow toward said ecology valve.

7. The fuel control system of claim 6 wherein said engine has a maximum speed and wherein said lightoff speed envelope comprises from about 10 to about 15 percent of said maximum engine speed.

* * * * *